United States Patent [19]
Murasaki

[11] Patent Number: 4,926,688
[45] Date of Patent: May 22, 1990

[54] PARKING LOCK FOR AUTOMOTIVE VEHICLES

[75] Inventor: Isao Murasaki, Okazaki, Japan

[73] Assignee: Mitsubishi Jidosha Kogyo Kabushiki Kaisha, Tokyo, Japan

[21] Appl. No.: 301,518

[22] Filed: Jan. 24, 1989

[30] Foreign Application Priority Data

Feb. 26, 1988 [JP] Japan .............................. 63-23835[U]

[51] Int. Cl.⁵ .............................................. G05G 5/06
[52] U.S. Cl. ........................................ 74/527; 74/878; 70/248
[58] Field of Search ............. 74/527, 529, 532, 473 R, 74/475, 878; 70/247, 248

[56] References Cited

U.S. PATENT DOCUMENTS

| | | | |
|---|---|---|---|
| 1,646,970 | 10/1927 | Martel | 70/248 |
| 1,675,465 | 7/1928 | Roehrich | 70/248 X |
| 4,232,571 | 11/1980 | Kimberlin | 70/247 X |
| 4,326,432 | 4/1982 | Miller | 70/248 X |
| 4,473,141 | 9/1984 | Mochida | 74/475 X |
| 4,474,085 | 10/1984 | DeVogelacre et al. | 74/475 X |
| 4,660,443 | 4/1987 | Simancik | 74/475 X |
| 4,671,085 | 6/1987 | Yamaguchi et al. | 70/248 |
| 4,679,417 | 7/1987 | Van Cise, Jr. | 70/247 |

FOREIGN PATENT DOCUMENTS 30783 6/1981 European Pat. Off. .............. 70/247

Primary Examiner—Rodney M. Lindsey
Attorney, Agent, or Firm—Abelman Frayne Rezac & Schwab

[57] ABSTRACT

A parking lock for an automotive transmission includes dual cams, one of which is moved by a detent pin carried by the gear shift lever and which in turn rotates the other of the cams, the other of the cams then being held against reverse rotation by movement of a key cylinder to a parking position, thus preventing release of the transmission from the parking position.

3 Claims, 4 Drawing Sheets

PARKING LOCK FOR AUTOMOTIVE VEHICLES

FIELD OF THE INVENTION

This invention relates to a parking lock for locking a selector lever of an automotive transmission in a parking position.

BACKGROUND OF THE INVENTION

In an automotive vehicle, a selector lever is disposed in the vehicle's passenger compartment, and is manually shifted stepwise in the longitudinal direction of the vehicle so as to select one of the power transmission ranges including a parking range (P), a reverse range (R), a neutral range (N), a drive range (D) and low speed ranges (I,II).

A conventional selector lever is not positively locked when in the parking position, and thus it can be inadvertently shifted by hand. If this happens when the vehicle is parked on a slope, the vehicle will start to move down the slope with gathering momentum.

With a view to avoid such a danger, various devices for locking the selector lever have been proposed. For example, a selector lever locking device of interlock type is disclosed in JP-A-60-135352.

In that disclosed locking device, an ignition key cannot be removed from a key cylinder until the selector lever has been set in the parking position. When the key is removed from the key cylinder while the selector lever is in the parking position, the selector lever is then locked in the parking position and cannot be shifted to any other position.

Describing in greater detail, when a release button provided on the selector lever is depressed to set the selector lever in the parking position, a detent pin provided on one end of an internal rod of the selector lever enters into a recess of a detent plate. The detent pin engages a cutout formed at one end of a bell crank to cause swinging movement of the bell crank. Due to this swinging movement of the bell crank, a cable or a rod connected to the other end of the bell crank is moved to cause a corresponding sliding movement of a slider connected to the other end of the cable or rod, thereby permitting rotational movement of the key cylinder. When the key cylinder is rotated to a locking position, and the key is then removed from the key cylinder, the slider is blocked against return movement by its engagement with the key cylinder. That is, the bell crank is held in the state in with its cutout is engaged by the detent pin thus preventing release of the selector lever when set in the parking position.

Therefore, even when the button provided on the selector lever is depressed under the above condition, the detent pin cannot be moved downward because its downward movement is restricted by the cutout of the bell crank, and the selector lever is locked in the parking position.

The bell crank is used to prevent the downward movement of the detent pin when the selector lever is set in the parking position. However, the relation between the stroke of the cable and that of the detent pin is determined by the lever ratio of the bell crank, and this is generally rectilinear as shown by a broken line in FIG. 5. Therefore, when the selector lever is set in the parking position, the detent pin must be kept engaged by the parking-purpose recess of the detent plate. However, the detent pin can become disengaged from the recess of the detent plate in the event that the connection cable or rod is subjected to permanent elongation or deformation.

Further, because the connection cable or rod extends through an outlet opening, the design of the outlet opening has been somewhat restricted.

SUMMARY OF THE INVENTION

It is an object of the present invention to provide a lock for a selector lever, in which means are provided to prevent disengagement of the detent pin from the parking-purpose recess of the detent plate even in the event that permanent elongation or deformation has occurred in the connection cable.

Another object of the present invention is to provide a lock for a selector lever device in which the outlet opening for the connection cable can be designed with a greater degree of freedom than hitherto.

In accordance with the present invention a selector lever is provided with a vertically movable detent pin which is engageable with and disengageable from a detent plate. A first cam is rotatably pivoted to the detent plate and is formed with a first abutting portion and an engaging portion which is engaged by the detent pin when the selector lever is set in the parking position. A second cam is rotatably pivoted to the detent plate and is formed with a second abutting portion adapted to abut the first abutting portion of the first cam. The second cam is connected to a connection member connected at its other end to a key cylinder for an ignition key. A biasing means biasses the first and second cams toward each other so as to bring the second abutting portion into positive abutment with the first abutting portion, whereby removal of the key from the key cylinder is permitted only when the selector lever is shifted to the parking position and the detent pin is in engagement with the detent plate.

The relation between the stroke of the connection member such as a cable or a rod and the stroke of the detent pin can be made nonlinear by suitably selecting the shape of the first and second cams. Therefore, a relatively large movement of the connection member and the second cam is required before the engaging portion of the first cam can be released, thus preventing undesired disengagement of the detent pin from the detent plate in the event of excessive slack on the connection member.

DETAILED DESCRIPTION OF THE PREFERRED EMBODIMENTS

Figure 1:
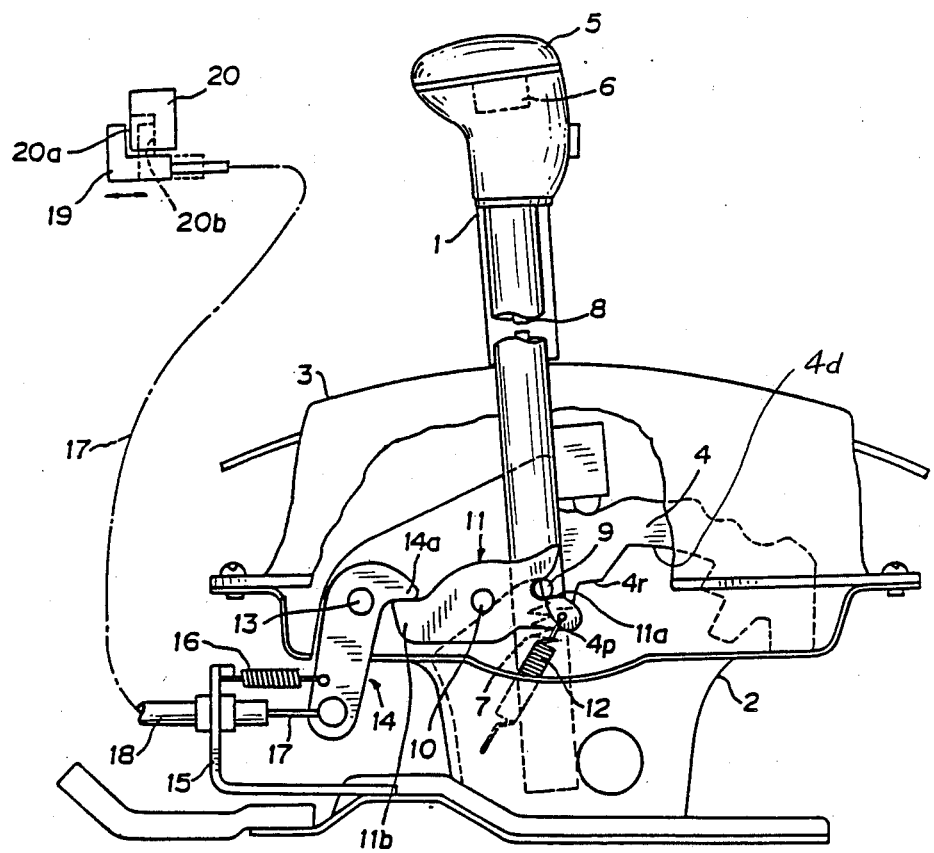
FIG. 1 is a partly cutaway, schematic side elevation view showing one embodiment of the selector lever device according to the present invention, shown in the locked position.

Referring to FIG. 1, a selector lever 1 is pivoted for movement relative to a bracket 2 fixed to the body of an automotive vehicle. The upper part of the selector lever 1 extends into the vehicle's passenger compartment through an indicator panel 3 integrally combined with the bracket 2.

A detent plate 4 formed with a consecutive series of pin-retaining recesses corresponding to individual ranges is disposed in the internal space of the bracket 2. In FIG. 1, reference symbols 4p, 4r and 4d designate the recesses corresponding to a parking range, a reverse range and a drive range respectively. These recesses 4p, 4r and 4d will be referred to hereinafter as a parking recess, a reverse recess and a drive recess respectively. A rod 8 is slidable within the selector lever 1. When a button 6 provided on a knob 5 of the selector lever 1 is depressed, the rod 8 is urged downward against the spring force of a spring 7. This rod 8 carries a detent pin 9 which is engageable with a selected one of the recesses 4p, 4r and 4d of the detent plate 4 when the rod 8 is urged downward. The spring 7 normally biases the rod 8 upward so that it acts to retain the detent pin 9 in a selected one of the recesses 4p, 4r and 4d. The selector lever 1 is connected to the automatic transmission gear system by a control cable (not shown).

At a position near the parking recess 4p which is the left endmost one of the recesses of the detent plate 4 in FIG. 1, a first cam 11 is rockably pivoted to the detent plate 4 by a pivot pin 10. This first cam 11 is formed at its front end with a cutout 11a acting as an engaging portion for the reception of the detent pin 9 when the selector lever 1 moved into the parking position. The first cam 11 is formed at its rear end with a cam portion 11b acting as a first abutting portion.

A first spring 12 is set under tension between the front end of the first cam 11 and a stationary part, for example, a part of the bracket 2. Therefore, the first cam 11 is maintained in a state as shown by broken lines in FIG. 2 when a force smaller than the spring force of the first spring 12 is imparted to the first cam 11.

A second cam 14 is also rockably pivoted to the detent plate 4 by a pivot pin 13. The second cam 14 is formed at its front end with a cam portion 14a acting as a second abutting portion engageable with the cam portion 11b formed at the rear end of the first cam 11. The rear end of the second cam 14 extends to the outside of the bracket 2, and a second spring 16 is set under tension between the rear end of the second cam 14 and a bracket 15 fixed to a part of the vehicle body. Therefore, the cam portion 14a formed at the front end of the second cam 14 makes normally resilient engagement with the cam portion 11b formed at the rear end of the first cam 11. Thus, in the illustrated embodiment of the present invention, the springs 12 and 16 constitute biasing means for biasing the first and second cams 11 and 14 toward each other so as to bring the second abutting portion 14a into positive abutment with the first abutting portion 11b. The spring force of the second spring 16 is selected to be smaller than that of the first spring 12.

An actuating cable 17 acting as a connection member is connected at one end to the rear end of the second cam 14. The actuating cable 17 extends through a cable guide 18 to be connected at the other end to a movable member 19 disposed on one side of the key cylinder of the ignition key. The ignition key cannot be removed from the key cylinder unless the key cylinder is rotated to its locking position. When the key cylinder is rotated to its locking position, a projection 20a of a latching member 20 integrally combined with the key cylinder is brought into the path of movement of the movable member 19 thereby restraining the movement of the movable member 19. On the other hand, when the key inserted in the key cylinder is turned to rotate the key cylinder to a position other than the locking position, a recess 20b instead of the projection 20a is brought in the path of movement of the movable member 19 thereby permitting free movement of the movable member 19.

Figure 2:
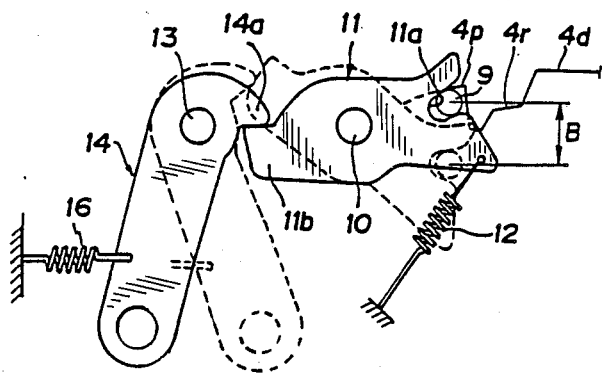
FIG. 2 is a schematic side elevation view of part of the selector lever device shown in FIG. 1, and showing the unlocked position of the device in dotted lines.

When the key is turned to rotate the key cylinder to a position other than the locking position, and the selector lever 1 is shifted to a position other than the position corresponding to the parking range, the first cam 11 and the second cam 14 are biased by the force of the first spring 12 to take a state as shown by dotted lines in FIG. 2. In such a state, the movable member 19 disposed on one side of the key cylinder has moved into the recess 20b of the latching member 20, so that the key cylinder cannot be rotated to the locking position.

When the bottom 6 on the knob 5 of the select lever 1 is depressed, and the select lever 1 is shifted to the parking position so as to park the vehicle, the detent pin 9 is received in the cutout 11a formed on the front end of the first cam 11 which is in the state shown by the broken lines in FIG. 2. Then, when the button 6 on the knob 5 of the selector lever 1 is released, the detent pin 9 is urged upward by the force of the spring 7 acting on the detent pin 9 until the detent pin 9 is fitted in the parking recess 4p of the detent plate 4. At the same time, the first cam 11 is rotated around the pivot pin 10 to take a state as shown by solid lines in FIGS. 1 and 2. Due to the rotation of the first cam 11, the second cam 14, whose cam portion 14a is in engagement with the cam portion 11b of the first cam 11, is also rotated around the pivot pin 13. As a result, the movable member 19 is urged by the actuating cable 17 to move out of the recess 20b of the latching member 20, and the key cylinder can now be rotated. Then, when the key is turned to rotate the key cylinder to the locking position, the latching member 20 is also rotated, and the projection 20a of the latching member 20 is located in the path of movement of the movable member 19, thereby restraining the rightward movement of the movable member 19 in FIG. 1. Thus, the actuating cable 17, second cam 14 and first cam 11 are maintained in their locked state.

In the locked state described above, depression of the button 6 on the knob 5 of the selector lever 1 cannot cause rotation of the first cam 11, and the detent pin 9 can not be disengaged from the parking recess 4p of the detent plate 4.

Figure 5:
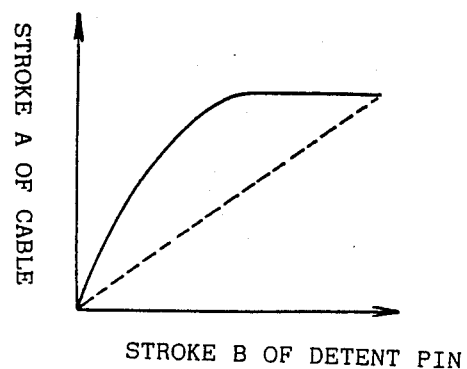
FIG. 5 is a graph showing the relation between the stroke of the actuating cable and that of the detent pin in the embodiment shown in FIG. 1, when compared to that of a prior art device.

By suitably selecting the shape of the cam portions 11b and 14a of the first and second cams 11 and 14 respectively, the relation between the stroke A of the actuating cable 17 and the stroke of the cutout 11a of the first cam 11, hence, the stroke B of the detent pin 9 can be made nonlinear as shown by the solid curve in FIG. 5. In due to the amplification of movement in the second cam 14, the stroke B of the detent pin 9 is smaller then the stroke A of the actuating cable 17 as will be readily apparent from FIG. 5. Thus, if the actuating cable 17 has been subjected to a slight permanent elongation, the detent pin 9 will be capable of only a minor amount of travel if the button 6 is depressed, and it will never be disengaged from the parking recess 4p of the detent plate 4.

When the vehicle is to be started from the parked condition, the key is inserted in the key cylinder and is turned to rotate the key cylinder to the starting position. The latching member 20 rotates together with the key cylinder, and the recess 20b of the latching member 20 is thus brought to the position opposite to the movable member 19, thereby releasing the movable member 19 from the restrained position.

When the button 6 on the knob 5 of the selector lever 1 is depressed, the detent pin 9 moves downward and rotates the first cam 11, the fast cam 11 in turn rotates the second car 14 against the bias of the spring 14, and in turn pulls on the connection member 17 to move the projection 20a into blocking engagement within the recess 20b, as the spring 12 is stronger the spring 16, the cams remain in this position when the detent 9 moves out of the recess 11a.

The detent pin 9 is locked in the parking recess 4p by two cams 11 and 14 as described above. Therefore, the relation between the stroke A of the connection member 17 and the stroke B of the detent pin 9 can be made nonlinear, so that the detent pin 9 is retained within the parking recess 4p of the detent plate 4 even when a slight permanent elongation or deformation has occurred in the connection member 17. Further, by suitably changing the shape of the first and second cams 11 and 14, the position of the outlet opening for the connection member 17 can be designed with a greater degree of freedom, which is advantageous from the aspect of design. Furthermore, the isolation of the connection member 17 and associated parts from the detent pin 9 and associated parts by the two cams 11 and 14 contributes to alleviation of vibrations.

The aforementioned embodiment is illustrative of a preferred embodiment of the present invention. The cam portions 11b and 14a of the first cam 11 and second cam 14 respectively can have various shapes other than those illustrated in FIGS. 1 and 2. Further, by suitably changing the shape of these cam portions 11b and 14b, the positioning of the cable outlet opening for the cable 17 connected to the second cam 14 can be designed with an increased degree of freedom of design.

Figure 3:
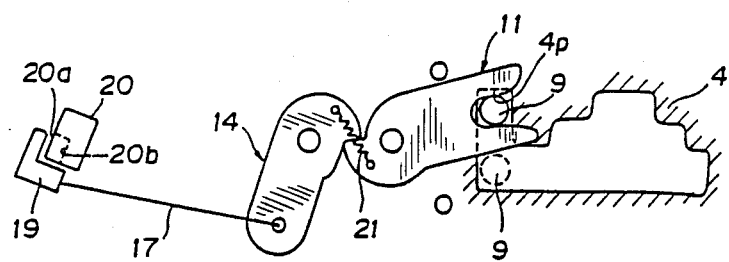
FIGS. 3 and 4 are schematic side elevation views of an alternative embodiment corresponding with in FIGS. 1 and 2.
Figure 4:
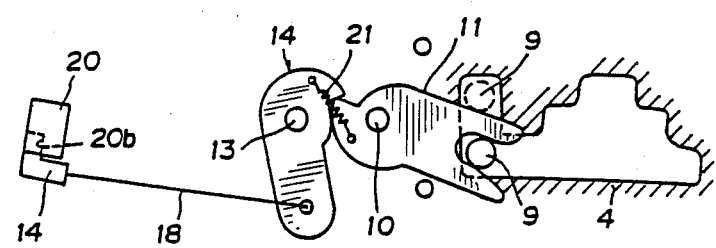

FIGS. 3 and 4 show a modification of the first embodiment, in which the rear end of the first cam 11 and the front end of the second cam 14 are linked by a spring 21. The structure of other parts and the operation of the device are the same as those of the first embodiment.

Figure 6:
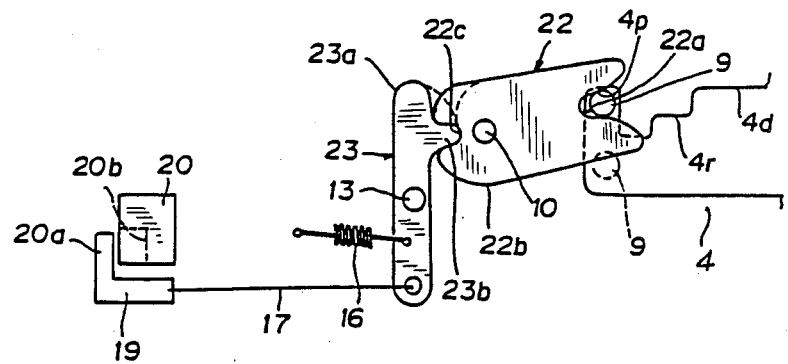
FIGS. 6 and 7 are schematic side elevation views of another alternative embodiment corresponding with FIGS. 1 and 2.
Figure 7:
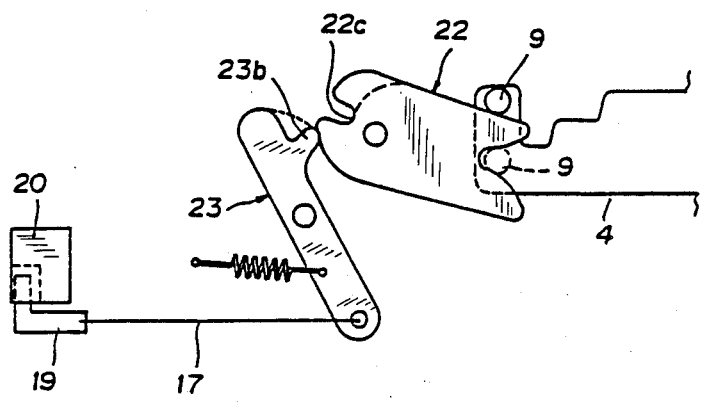

FIG. 6 and 7 show another modification of the first embodiment in which the first cam 11 and the second cam 14 are replaced by a first cam 22 and a second cam 23 respectively. The first cam 22 is formed with a cutout 22a at its front end and a cam portion 22b at its rear end, and a recess 22c is formed in the cam portion 22b. In a locking state, this recess 22c is engaged by a projection 23b projecting from a cam portion 23a formed at the front end of the second cam 23. The structure of other parts and the operation of the device are entirely the same as those of the first embodiment.

Although a cable is used as the connection member in the aforementioned embodiments, it is apparent that a rod or the combination of a cable and a rod can also be used.

I claim:

1. A parking lock for use in an automotive vehicle having an automatic transmission gear system with a rotatable output shaft and having a key cylinder adapted to receive an ignition key, said lock comprising:
    a selector lever adapted to be shifted into any one of a plurality of positions, including a parking position, said output shaft being locked against rotation when the lever is in parking position;
    a horizontally projecting detent pin secured to said lever and vertically movable from a first position when the lever is in any position other than the parking position to a second position when the lever is in the parking position;
    a detent plate which is engaged by the pin when the pin is in the second position and is disengaged from the plate when the pin is in the first position;
    a first cam rotatably pivoted to said detent plate and formed with a first abutting portion and an engaging portion, said engaging portion being engaged by said detent pin when the selector lever is set in said parking position;
    a second cam rotatably pivoted to said detent plate and formed with a second abutting portion adapted to abut said first abutting portion of said first cam;
    a connection member having first and second ends, the first end of the member connected to the key cylinder, the second end of the member being connected to an end of the second cam; and
    biasing means for biasing the first and second cams toward each other so as to bring the second abutting portion into positive abutment with said first abutting portion, whereby removal of the key from the key cylinder is permitted only when the selector lever is shifted to said parking position and the detent pin is in engagement with the detent plate.

2. A parking lock for an automotive vehicle according to claim 1, wherein said biasing means includes spring means reacting between said second cam and a member fixed to the vehicle body.

3. A parking lock for an automotive vehicle according to claim 1, wherein said biasing means includes spring means disposed between said second cam and said first cam.

* * * * *